United States Patent
Houser et al.

(10) Patent No.: US 10,445,354 B2
(45) Date of Patent: Oct. 15, 2019

(54) SYSTEM TO DETERMINE A CREDIBILITY WEIGHTING FOR ELECTRONIC RECORDS

(71) Applicant: Hartford Fire Insurance Company, Hartford, CT (US)

(72) Inventors: Reuben Emory Houser, Hartford, CT (US); Qiao Wang, Avon, CT (US); Arthur Paul Drennan, III, West Granby, CT (US); Nicole Rose Sims, Sandy, UT (US); Tracey Ellen Steger, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 409 days.

(21) Appl. No.: 15/285,790

(22) Filed: Oct. 5, 2016

(65) Prior Publication Data

US 2018/0096055 A1 Apr. 5, 2018

(51) Int. Cl.
*G06F 16/33* (2019.01)
*G06F 16/951* (2019.01)
*G06F 16/36* (2019.01)

(52) U.S. Cl.
CPC .......... *G06F 16/3344* (2019.01); *G06F 16/36* (2019.01); *G06F 16/951* (2019.01)

(58) Field of Classification Search
CPC .............................. G06F 17/20; G06F 16/3344
See application file for complete search history.

(56) References Cited

U.S. PATENT DOCUMENTS

| | | | |
|---|---|---|---|
| 8,117,043 B2 | 2/2012 | Hu et al. | |
| 8,457,984 B2 | 6/2013 | Hu et al. | |
| 8,620,698 B2 | 12/2013 | Hu et al. | |
| 9,026,551 B2 | 5/2015 | Drennan, III | |
| 9,378,527 B2 | 6/2016 | Adams et al. | |
| 2006/0089862 A1 | 4/2006 | Anandarao et al. | |
| 2012/0173289 A1 | 7/2012 | Pollard et al. | |
| 2012/0271659 A1 | 10/2012 | Zizzamia et al. | |
| 2014/0200930 A1 | 7/2014 | Zizzamia et al. | |
| 2015/0073943 A1* | 3/2015 | Norris ................... | G06F 19/324 705/26.63 |
| 2015/0205863 A1 | 7/2015 | Drennan, III | |

(Continued)

*Primary Examiner* — Mariela Reyes
*Assistant Examiner* — Courtney Harmon
(74) *Attorney, Agent, or Firm* — Buckley, Maschoff & Talwalkar LLC

(57) ABSTRACT

Text input data may be aggregated and mapped to create composite text input data for electronic records. A semantic event may be automatically detected, triggered by a semantic rule and associated semantic tag. The detected semantic event may be flagged, and a text mining result database may be updated by adding an entry to the database. An indication associated with the event may be transmitted, and a back-end application computer server may establish a hierarchy for multiple elements of the electronic records. The computer server may determine a weight variable and response variable for each element in the hierarchy and apply a hierarchical credibility weighting methodology to the elements from level 1, representing the least granular level in the hierarchy, to level n, representing the most granular level in the hierarchy, calculated recursively from level n, to determine a final estimated credibility for the electronic records.

20 Claims, 20 Drawing Sheets

| i | LEVEL | EXAMPLE | TOTAL CLAIMS ($\omega_i$) | RESOLUTION COST RATIO ($X_i$) | CREDIBILITY ($Z_i$) | "RESOLUTION COST" RATIO xLOWER LEVELS ($X_i'$) | PARTIAL CREDIBILITY ($Z_i'$) | FINAL ESTIMATE ($X_n$) |
|---|---|---|---|---|---|---|---|---|
| 1 | ALL | ALL | 862,926 | 9.7% | 100% | 9.9% | 1.1% | – |
| 2 | EFFECTIVE YR | 2020 | 141,243 | 9.1% | 98.9% | 8.8% | 14.3% | – |
| 3 | RISK STATE | CA | 8,262 | 14.2% | 84.6% | 11.2% | 0.5% | – |
| 4 | ZIP STATE | CA | 7,942 | 14.3% | 84.1% | 12.4% | 17.0% | – |
| 5 | CSA | LOS ANGELES – LONG BEACH, CA | 3,065 | 17.5% | 67.1% | 16.9% | 3.5% | – |
| 6 | CBSA | LONG BEACH – ANAHEIM, CA | 2,620 | 17.6% | 63.6% | 14.7% | 9.7% | – |
| 7 | FIPS COUNTY | 06037 | 1,751 | 19.0% | 53.9% | 18.9% | 52.2% | – |
| 8 | 5-DIGIT ZIP | 90210 | 25 | 24.0% | 1.6% | 24.0% | 1.6% | 15.8% |

CREDIBILITY FACTOR (K): 1,500 n = 7

(56) References Cited

U.S. PATENT DOCUMENTS

2015/0317337 A1\* 11/2015 Edgar .................... G06Q 10/00
                                                        707/751
2016/0055589 A1    2/2016 Billings
2016/0350294 A1\* 12/2016 Nefedov ................. G06F 16/93
2017/0255862 A1\*  9/2017 Li ......................... G06N 5/022

\* cited by examiner

TOTAL CLAIM COUNTS AT POLICY LEVEL, FOR EACH REPORTED YEAR (YR), FROM TEXT MINING PLATFORM — 310

| POLICY ID | REPORTED YR | TOTAL CLAIM COUNT | "RESOLUTION COST" |
|---|---|---|---|
| P_10001 | 2013 | 24 | 4 |
| P_10001 | 2014 | 59 | 13 |
| P_10001 | 2015 | 48 | 7 |
| P_10001 | 2016 | 58 | 8 |
| P_10001 | 2017 | 29 | 2 |
| P_10001 | 2018 | 33 | 2 |
| P_10001 | 2019 | 43 | 3 |
| P_10001 | 2020 | 55 | 7 |
| P_10001 | 2021 | 66 | 5 |
| P_10001 | 2022 | 59 | 7 |

— 312

SUMMARIZED USING PRIOR 5 YEARS OF POLICY WITH A GAP — 320

| POLICY ID | EFFECTIVE YR | TOTAL CLAIM COUNT | "RESOLUTION COST" |
|---|---|---|---|
| P_10001 | 2022 | 218 | 22 |

FIG. 3B

| LEVEL | EXAMPLE | INDIVIDUAL GROUPS | EFFECTIVE COMBINATIONS |
|---|---|---|---|
| ALL | ALL | 1 | 1 |
| EFFECTIVE YEAR | 2018 | 7 | 7 |
| RISK STATE | CA | 50 | 340 |
| ZIP STATE | CA | 56 | 1,967 |
| CSA | LOS ANGELES – LONG BEACH, CA | 168 | 3,658 |
| CBSA | LONG BEACH – ANAHEIM, CA | 878 | 8,737 |
| FIPS COUNTY | 06037 | 2,902 | 21,325 |
| 5-DIGIT ZIP | 90210 | 27,248 | 152,553 |

| i | LEVEL | EXAMPLE | TOTAL CLAIMS ($\omega_i$) | RESOLUTION COST RATIO ($X_i$) | CREDIBILITY ($Z_i$) | "RESOLUTION COST" RATIO xLOWER LEVELS ($X_i'$) | PARTIAL CREDIBILITY ($Z_i'$) | FINAL ESTIMATE ($X_n$) |
|---|---|---|---|---|---|---|---|---|
| 1 | ALL | ALL | 862,926 | 9.7% | 100% | 9.9% | 1.1% | -- |
| 2 | EFFECTIVE YR | 2020 | 141,243 | 9.1% | 98.9% | 8.8% | 14.3% | -- |
| 3 | RISK STATE | CA | 8,262 | 14.2% | 84.6% | 11.2% | 0.5% | -- |
| 4 | ZIP STATE | CA | 7,942 | 14.3% | 84.1% | 12.4% | 17.0% | -- |
| 5 | CSA | LOS ANGELES – LONG BEACH, CA | 3,065 | 17.5% | 67.1% | 16.9% | 3.5% | -- |
| 6 | CBSA | LONG BEACH – ANAHEIM, CA | 2,620 | 17.6% | 63.6% | 14.7% | 9.7% | -- |
| 7 | FIPS COUNTY | 06037 | 1,751 | 19.0% | 53.9% | 18.9% | 52.2% | -- |
| 8 | 5-DIGIT ZIP | 90210 | 25 | 24.0% | 1.6% | 24.0% | 1.6% | 15.8% |

CREDIBILITY FACTOR ($K$)
1,500

| SEMANTIC RULE IDENTIFIER 862 | RULE DESCRIPTION 864 | SEMANTIC TAGS 866 |
|---|---|---|
| SR_100001 | 3RD_PARTY_ONLY | 3RD; THIRD; PARTY; PARTIES; EMPLOYER |
| SR_100002 | ANIMAL_BITE | DOG; DOGS; ATTACK; ATTACKS; CLAIMANT |
| SR_100003 | OFF_PREMISES | LEAVE; PREMISE; FACTORY; OUTSIDE |
| SR_100004 | SCHOOL | CAMPUS; STUDENT; TEACHER; CLASSROOM |

| TEXT MINING RESULT IDENTIFIER 882 | LOSS EVENT 884 | DATE 886 | RULE IDENTIFIER 888 | CLAIM IDENTIFIER 890 |
|---|---|---|---|---|
| TMR_10001 | ANIMAL BITE | 7/15/2010 | SR_100001 | C_4389523 |
| TMR_10002 | BACK INJURY | 4/21/2014 | SR_100010 | C_8782378 |
| TMR_10003 | ACCIDENT | 11/30/2015 | SR_100093 | C_1348933 |
| TMR_10004 | BACK INJURY | 1/14/2016 | SR_100010 | C_2372978 |
| TMR_10005 | PREGNANCY | 7/15/2016 | SR_100077 | C_0983778 |

SYSTEM TO DETERMINE A CREDIBILITY WEIGHTING FOR ELECTRONIC RECORDS

BACKGROUND

An entity, such as enterprise, may want to analyze or "mine" large amounts of data, such as text data. For example, an enterprise might want to analyze tens of thousands of text files to look for patterns (e.g., so that predictions can be made and/or resources may be allocated in appropriate ways). Note that an entity might analyze this data in connection with different purposes, and, moreover, different purposes may need to analyze the data in different ways. For example, a single acronym might refer to one thing when it appears in one type of document and different thing when it appears in a different type of document. It can be difficult to identify patterns across such large amounts of data and different purposes. In addition, manually managing the different needs and requirements (e.g., different logic rules) associated with different purposes can be a time consuming and error prone process.

Note that electronic records may be used to store information for an enterprise. Moreover, it may be advantageous for an enterprise to accurately assign a credibility value to various views of the data. For example, a subset of the electronic records (e.g., filtered based on one or more keywords discovered during a text-based analysis of the data) might be used to generate a view of the data at a particular level of granularity. In some cases, however, the amount of information available in the electronic records in connection with a particular level of granularity might be too small to be statistically meaningful. For example, if only one or two (or even zero) records exist having the keyword at a particular level of granularity, it might not be possible to draw meaningful conclusions about the overall usefulness of the information for the enterprise. In some cases, an enterprise might be interested in quantifying how unique a particular outcome will be as compared to an outcome deemed as "typical." As used herein, this value may be referred to as "credibility."

An enterprise may use credible information to help properly allocate resources, plan for future events, etc. Thus, there is a need in the art for methods and systems using text mining to properly assign credibility weightings for electronic records. In addition, there is a need in the art for methods and systems of addressing these values.

SUMMARY OF THE INVENTION

According to some embodiments, systems, methods, apparatus, computer program code and means are provided for using text mining to properly assign credibility weightings for electronic records. In some embodiments, text input data may be aggregated and mapped to create composite text input data for electronic records. A semantic event may be automatically detected, triggered by a semantic rule and associated semantic tag. The detected semantic event may be flagged, and a text mining result database may be updated by adding an entry to the database. An indication associated with the event may be transmitted, and a back-end application computer server may establish a hierarchy for multiple elements of the electronic records. The computer server may determine a weight variable and response variable for each element in the hierarchy and apply a hierarchical credibility weighting methodology to the elements from level 1, representing the least granular level in the hierarchy, to level n, representing the most granular level in the hierarchy, calculated recursively from level n, to determine a final estimated credibility for the electronic records.

Some embodiments provide: means for aggregating and mapping received text input data to create composite text input data for the electronic records; means for automatically detecting a semantic event in the composite text input data triggered by a semantic rule and associated semantic tag; means for flagging the detected semantic event as meeting a pre-determined condition; means for updating a text mining result database, responsive to the flag, by adding an entry to the database identifying the detected semantic event and the triggering semantic rule; means for transmitting an indication associated with the event based on the associated data in the text mining result database; means for establishing a hierarchy for multiple elements of the electronic records; means for determining a weight variable and response variable for each element in the established hierarchy; means for applying a hierarchical credibility weighting methodology to the elements of the electronic records from level 1, representing the least granular level in the hierarchy, to level n, representing the most granular level in the hierarchy, calculated recursively from level n, to determine a final estimated credibility for the electronic records based on the weight variable and response variable; and means for outputting an indication of the final estimated credibility for the electronic records.

A technical effect of some embodiments of the invention is an improved and computerized way of using text mining to properly assign credibility weightings for electronic records. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 3B illustrates an example of text mining platform data according to some embodiments described herein.

FIG. 6. is example of credibility analysis results that might be provided in accordance with any of the embodiments described herein.

FIG. 8B illustrates a tabular portion of a semantic rules database in accordance with some embodiments.

FIG. 8C illustrates a tabular portion of a text mining results database in accordance with some embodiments.

DETAILED DESCRIPTION

Figure 1:
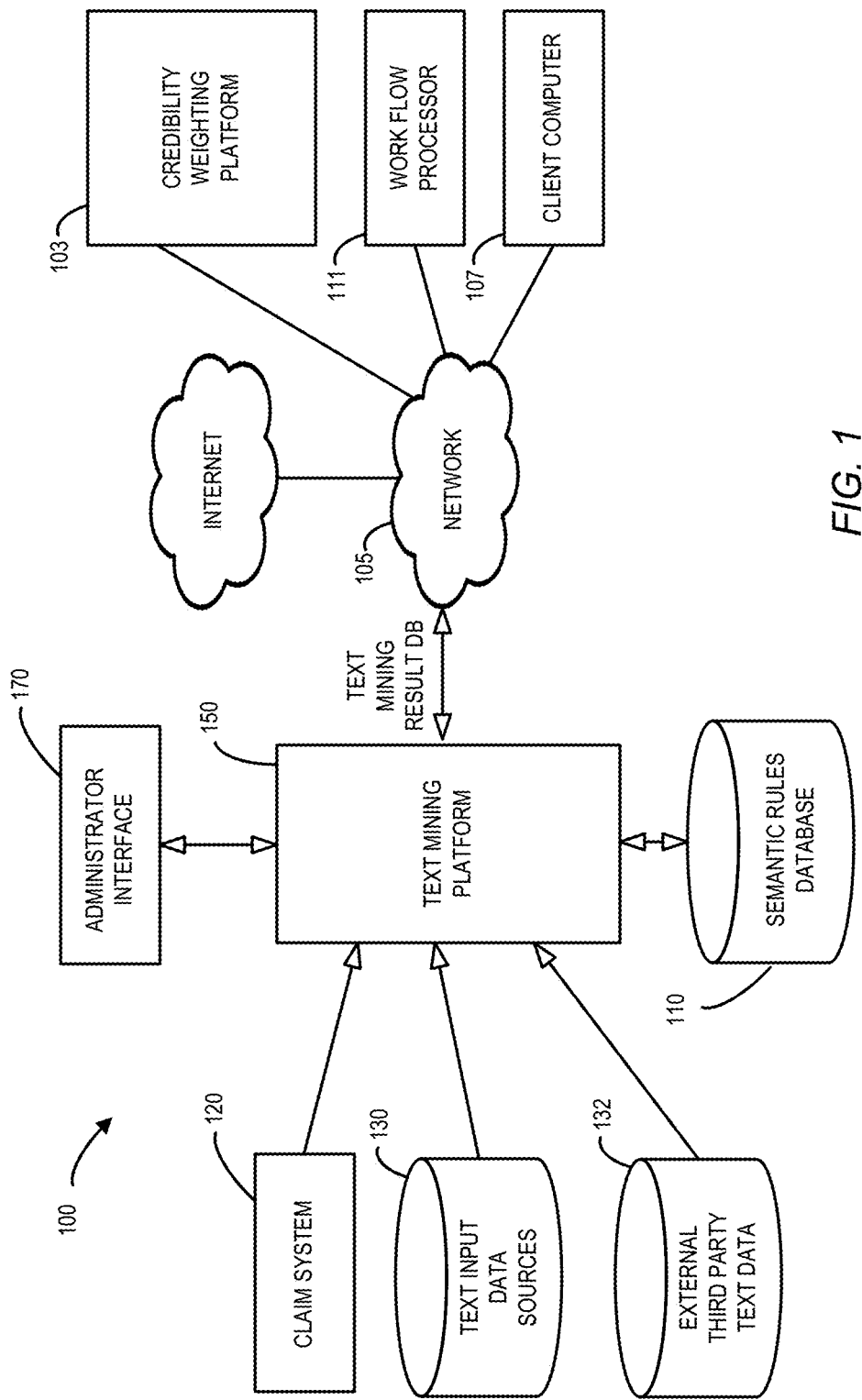
FIG. 1 is block diagram of a system according to some embodiments of the present invention.

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third-party systems, networks, and subsystems. For example, in the present invention information may be transmitted to remote devices from a back-end application server and electronic records may be routed as appropriate, thus improving the overall performance of the system associated with message storage requirements and/or bandwidth considerations (e.g., by reducing the number of messages that need to be transmitted via a network). Moreover, embodiments associated with automatic predictions might further improve communication network performance, user interactions, real time chat or telephone call center responsiveness (e.g., by better preparing and/or allocating resources), the provisioning of medical services, the assignment of monetary funds as appropriate, etc.

An entity, such as an insurance company, may want to analyze or "mine" large amounts of data, such as text data. For example, an insurance company might want to analyze tens of thousands of insurance claim text files to look for patterns (e.g., a particular type of injury has occurred more frequently for employees who work in a particular industry). Note that an entity might analyze this data in connection with different types of applications, and, moreover, different applications may need to analyze the data differently. For example, the term "IV" might referent to an "Insured Vehicle" when it appears in an automobile accident report and to "Intra-Venous" when it appears in a medical file. It can be difficult to identify patterns across such large amounts of data and different types of applications. In addition, manually managing the different needs and requirements (e.g., different business logic rules) associated with different applications can be a time consuming and error prone process.

Further note that it may be advantageous for an enterprise to accurately assign a credibility value to various views of the data. For example, a subset of the electronic records (e.g., filtered based on one or more keywords discovered during a text-based analysis of the data) might be used to generate a view of the data at a particular level of granularity. In some cases, however, the amount of information available in the electronic records in connection with a particular level of granularity might be too small to be statistically meaningful. For example, if only one or two (or even zero) records exist having the keyword at a particular level of granularity, it might not be possible to draw meaningful conclusions about the overall usefulness of the information for the enterprise. In some cases, an enterprise might be interested in quantifying how unique a particular outcome will be as compared to an outcome deemed as "typical." As used herein, this value may be referred to as "credibility."

An enterprise may use credible information to help properly allocate resources, plan for future events, etc. Thus, there is a need in the art for methods and systems using text mining to properly assign credibility weightings for electronic records. In addition, there is a need in the art for methods and systems of addressing these values. FIG. 1 is block diagram of a system 100 according to some embodiments of the present invention. In particular, the system 100 includes a text mining platform 150 that receives information from a semantic rules database 110, a claim system 120, one or more text input data sources 130 (e.g., internal to an insurance enterprise), and/or external third party text data 132 (e.g., reports issued by the National Highway Safety Board ("NHSB")). The text mining platform 150 might be, for example, associated with a Personal Computer ("PC"), laptop computer, an enterprise server, a server farm, and/or a database or similar storage devices. The text mining platform 150 may, according to some embodiments, be associated with a business organization or an insurance provider.

As used herein, devices, including those associated with the text mining platform 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" text mining platform 150 may access semantic rules in the semantic rules database 110 to mine the information from the claim system 120 and/or the other text input data sources 130. As used herein, the term "automated" may refer to, for example, actions that can be performed with little or no human intervention.

The text mining platform 150 may store information into and/or retrieve information from the semantic rules database 110 and/or a text mining result database that is output to various external insurance applications (e.g., software applications or devices associated with subrogation, fraud detection, recovery factor analysis, etc.). The semantic rules database 110 may be a locally stored relational database or reside remote from the text mining platform 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface 170 may provide an ability to access and/or modify the semantic rules database 110 via the text mining platform 150. The administrator interface 170 might, for example, let an administrator define terms, dictionaries, mapping rules, etc. associated with text mining. The data sources 130, 132 may be thought of as "publishers" of information to be consumed by the text mining platform 150, and any insurance applications may be considered "subscribers" to information created by the text mining platform 150. Moreover, note that the text mining platform 150 may operate asynchronously and/or independently of any insurance application.

Although a single text mining platform 150 is shown in FIG. 1, any number of such devices may be included. Moreover, various devices described herein might be combined according to embodiments of the present invention. For example, in some embodiments, the text mining platform 150 and semantic rules database 110 might be co-located and/or may comprise a single apparatus.

Figure 2:
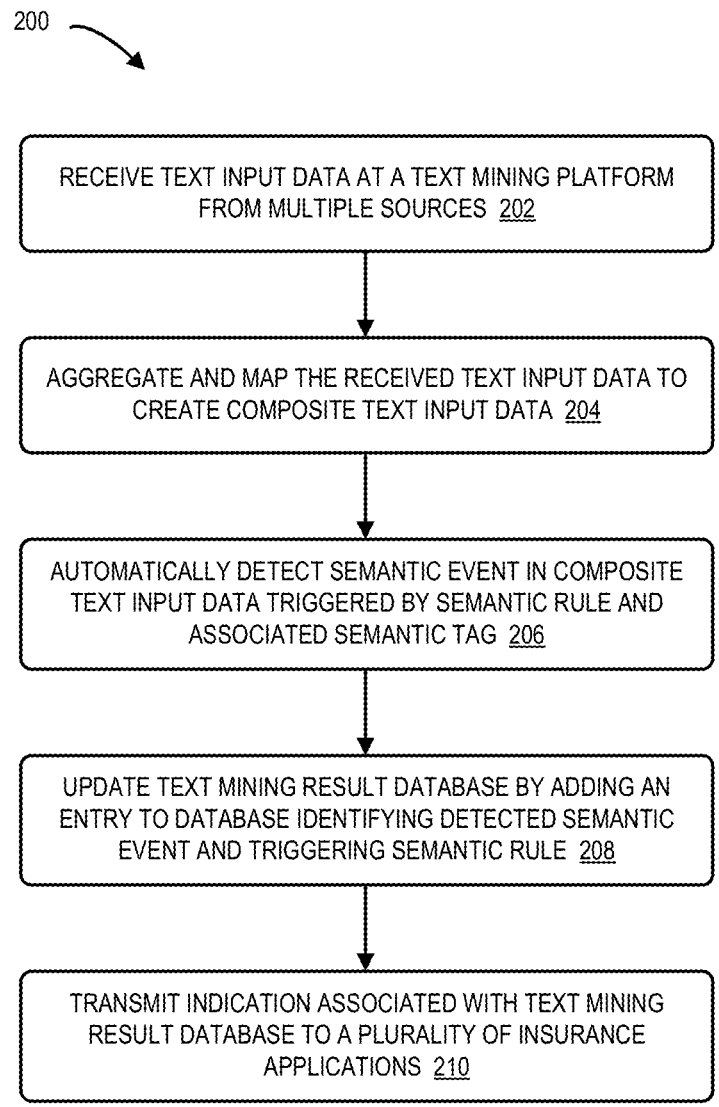
FIG. 2 illustrates a method in accordance with some embodiments of the present invention.

In this way, the system 100 may mine text in an efficient and accurate manner. For example, FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, text input data is received at a text mining platform from multiple sources. For example, thousands of insurance claim files may be received on a periodic basis or in substantially real time. Although insurance claim files are described in connection with some embodiments herein, note that other types of information may also be received and/or analyzed. For example, the text input data might be associated an insurance claim note, a medical report, a police report, social network data, a loss description, an injury description, a First Notice Of Loss ("FNOL") statement, a telephone call transcript (e.g., create via a voice recognition application), Optical Character Recognition ("OCR") data, third-party data, and/or a governmental agency (e.g., weather reports).

At 204, the received text input data is aggregated and mapped to create composite input text data. For example, the received text input data might be rearranged, converted into a standard format, fields may be mapped in accordance with a source identifier, abbreviations, words, and/or phrases may be modified as appropriate to a common usage, etc.

At 206, a semantic event may be automatically detected in the composite text input data triggered by a semantic rule and associated semantic tag. According to some embodiments, the semantic event may be associated with the triggering detection of a word, a phrase, a shorthand term, a course of action (e.g., use of a prescription drug), and/or an enterprise name (e.g., an insurance carrier name). The triggering semantic rule might be associated with, for example, a noun, a verb, a definition, a semantic tree, a named entity recognition rule, a root, a noun phrase, a prepositional phrase, and/or a verb phrase. According to some embodiments, the triggering semantic rule was previously defined by an administrator using a graphical user interface. In some cases, one or more pre-determined conditions may be applied to flag the detected semantic event (e.g., to reduce the number of semantic events to be eventually reported to insurance applications). For example, a pre-determined condition may require that a word or phrase must be detected a pre-determined number of times or within a pre-determined proximity of another word or phrase.

A text mining result database may be updated at 208 by adding an entry to the database identifying the detected semantic event and the triggering semantic rule (note that, if applicable, only flagged events may result in a new entry be created in the database). The added entry might, for example, include a file note identifier, an insert date, a text source, a rule identifier, and/or a line of business.

At 210, an indication associated with the text mining result database may be transmitted to a plurality of insurance applications. The insurance applications might be associated with, for example, a workers' compensation claim, a personal insurance policy, a business insurance policy, an automobile insurance policy, a home insurance policy, a sentiment analysis, insurance event detection, a cluster analysis, a predictive model, a subrogation analysis, fraud detection, a recovery factor analysis, large loss and volatile claim detection, a premium evasion analysis, an insurance policy comparison, an underwriting decision, and/or indicator incidence rate trending application. Note that the transmitted indication might be used to trigger an insurance application (e.g., by triggering a fraud detection analysis) and/or update an insurance application (e.g., by updating a variable or weighing factor of a predictive model).

In some cases, the transmitted indication might be associated with credibility weighting information for an insurance claim (or a set of insurance claims). For example, referring again to FIG. 1, the system 100 further contains a credibility weighting platform 103 (e.g., associated with a back-end application computer server), a network 105, a client terminal 107, and a workflow processor 111.

The credibility weighting platform 103 includes one or more computer processors, a memory storing one or more programs, and other hardware and software for executing embodiments described herein. More specifically, the software may be computer readable instructions, stored on a computer readable media, such as a magnetic, optical, magneto-optical, holographic, integrated circuit, or other form of non-volatile memory. The instructions may be coded, for example, using C, C++, JAVA, SAS or other programming or scripting language. To be executed, the respective computer readable instructions are loaded into RAM associated with the credibility weighting platform 103.

Referring back to FIG. 1, the network 105 might enable the transfer of claim data between the data warehouse, the credibility weighting platform 103, the client computer 107, the business workflow processor 111, and third party suppliers or vendors of data. The network 105 includes a LAN as well as a connection to the Internet.

The client computer or terminal 107 includes a computer that has a CPU, display, memory and input devices such as a keyboard and mouse. The client terminal 107 also includes a display and/or a printer for outputting the results of the analysis carried out by the predictive model 104. The client terminal 107 also includes an input module where a new claim may be filed, and where information pertaining to the claim may be entered, such as a notice of loss, for example. In addition to being implemented on the client terminal 107, or in the alternative, the input module may be implemented on other insurance company computing resources on the network 105. For example, the input module may be implemented on a server on the network 105 for receiving claims over the Internet from one or more websites or client applications accessed by insurance company customers, company agents, or third party preprocessors or administrators. The input module is preferably implemented as computer readable and executable instructions stored on a computer readable media for execution by a general or special purpose processor. The input module may also include associated hardware and/or software components to carry out its function. For example, for implementations of the input module in which claims are entered manually based on the notice of loss being received telephonically, the input module preferably includes a voice recording system for recording, transcribing, and extracting structural data from such notices.

The workflow processor 111 includes one or more computer processors and memory storing data pertaining to claim handlers, supervisors, medical reviewers, medical providers, medical provider supervisors, private investigators, and other vendors. Stored information may include, without limitation, experience, skill level, reputation, domain knowledge, and availability. The workflow processor 111 also includes other hardware and software used to assign a claim to at least one of a claim handler, supervisor, medical reviewer, medical provider, medical provider supervisor, legal services provider, and independent investigator by the credibility weighting platform 103. For example, in one implementation, the workflow processor 111 assigns more aggressive medical care and review to claims having higher likelihoods of being volatile claims, thereby applying resources to those that might benefit the most. The level of medical care and/or review management may be tiered. Medical care and review may include, without limitation, review and/or treatment from physical therapists, occupational therapists, vocational rehabilitation providers, physicians, nurses, nurse case managers, psychologists, alternative medical practitioners, chiropractors, research specialists, drug addiction treatment specialists, independent medical examiners, and social workers. The selection of the level of review and/or care may include a selection of a particular provider having the skills, experience, and domain knowledge applicable to the claim, an aggressiveness of treatment or review, and/or frequency of treatment or review. The workflow processor 111 or the credibility weighting platform 103 may also have software configured to determine a general expense tolerance for a claim, i.e., a tolerance for expending resources on costs not associated with compensating a claimant or covered individual.

As an alternative to the illustrated FIG. 1, the physical components of a data warehouse, client computer 107, credibility weighting platform 103, and workflow processor 111 may be housed within the same computing device. As another alternative, the functionality of the credibility weighting platform 103 and workflow processor 111 may be implemented on a single computing device.

According to some embodiments, the credibility weighting platform 103 may apply a credibility weighting methodology to text mining platform 150 data. The data may be, for example, summarized at the ZIP code level as a means to give an insurance company a geographic proxy of claim litigiousness and adverse claim severity.

Figure 3A:
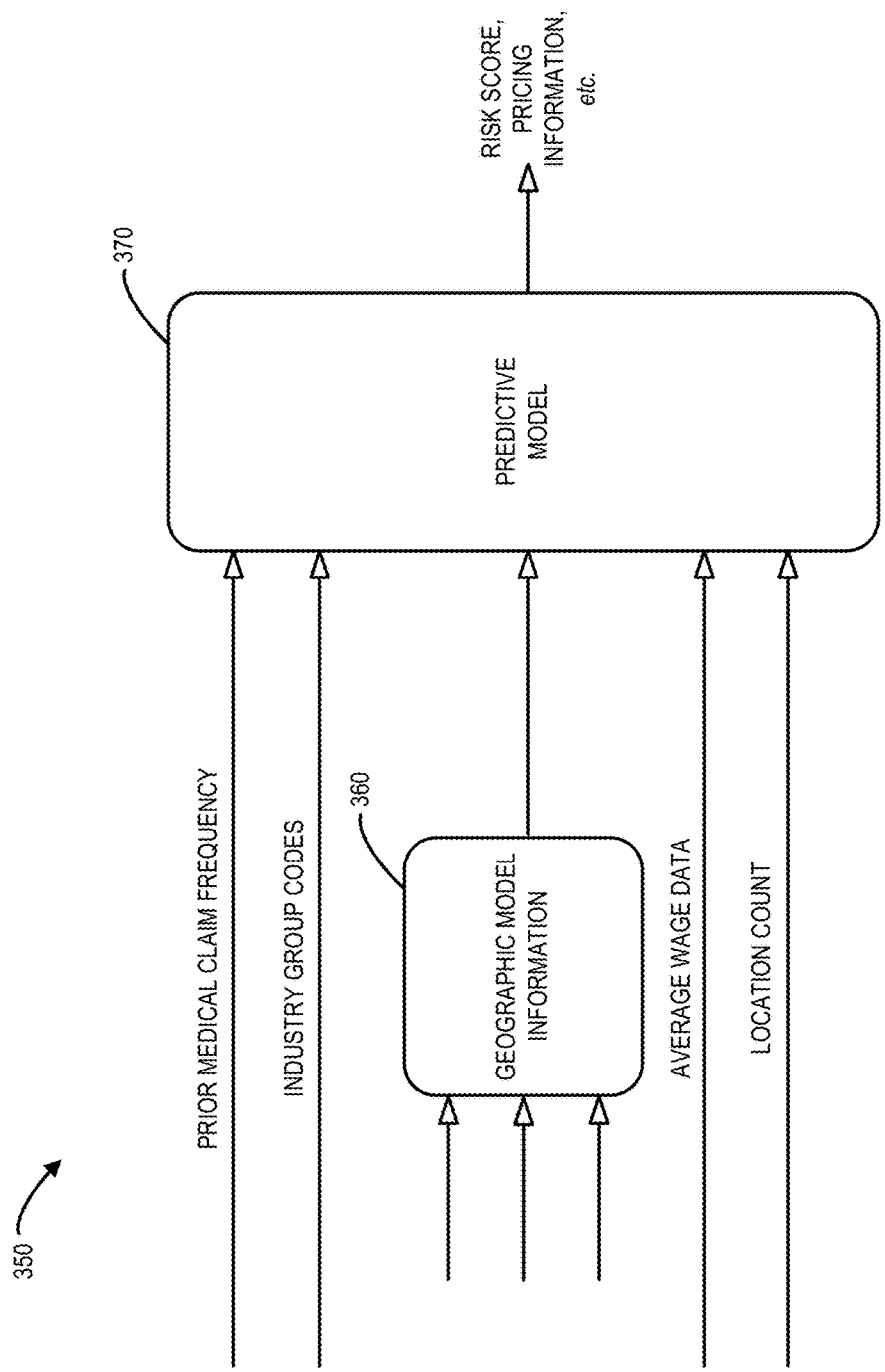
FIG. 3A illustrates a system in which a predictive model utilizes information from a text mining platform in accordance with some embodiments.

According to some embodiments, a system may use the data mined by the text mining platform to generate a risk score, pricing information, etc. For example, FIG. 3A illustrates a system 360 in which a predictive model 370 utilizes information mined by a text mining platform according to some embodiments. According to some embodiments, the predictive model 370 might receive a set of variables and use those variables (and, in some cases, associated weighting factors) to generate a result. The variables might include, for example, prior medical claim frequency data, industry group codes, average wage data, location count data (e.g., how many distinct locations a policy is associated with), etc. According to some embodiments, the received variables might include one or more geographic variables (which could be separately received and processed by the predictive model 370 or, as illustrated in FIG. 3A, might be combined into a single variable by a geographic model information element 360). The geographic variables might include, for example, a number of office visits per 1000 residents, education information, etc.

From the data mined by the text mining platform 150, total claim counts and claim counts for each respective text flag (e.g., "Attorney," "Contractor," etc.) may be summarized at the policy and report year level as illustrated by the table 310 in the example 300 of FIG. 3B. Note that the information in the table 310 might be generated by the enterprise (e.g., in connection with a claim file), include elements from a big data stream, be purchased from or otherwise associated with third-party data, etc. As illustrated in FIG. 3B, a selection 312 of five prior report years with a one-year report year gap prior to the policy effective year might be selected to be analyzed for simplicity and consistency. Thus, a policy effective in 2022 would be summarized 320 using the claims reported from 2016-2020. Additional policy characteristics (e.g., an indication that claims are associated with smoking, diabetes, heart disease, etc.) may then be mapped in and the ratios of the text flag counts to total claim counts may be calculated (e.g., the number of claims satisfying a "resolution cost" condition might be divided by the total claim count to generate the ratio). Note that a "resolution cost" condition might take into account several different characteristics associated with a claim including a settlement status, a resolved status, a disputed status, etc.

Figure 4:
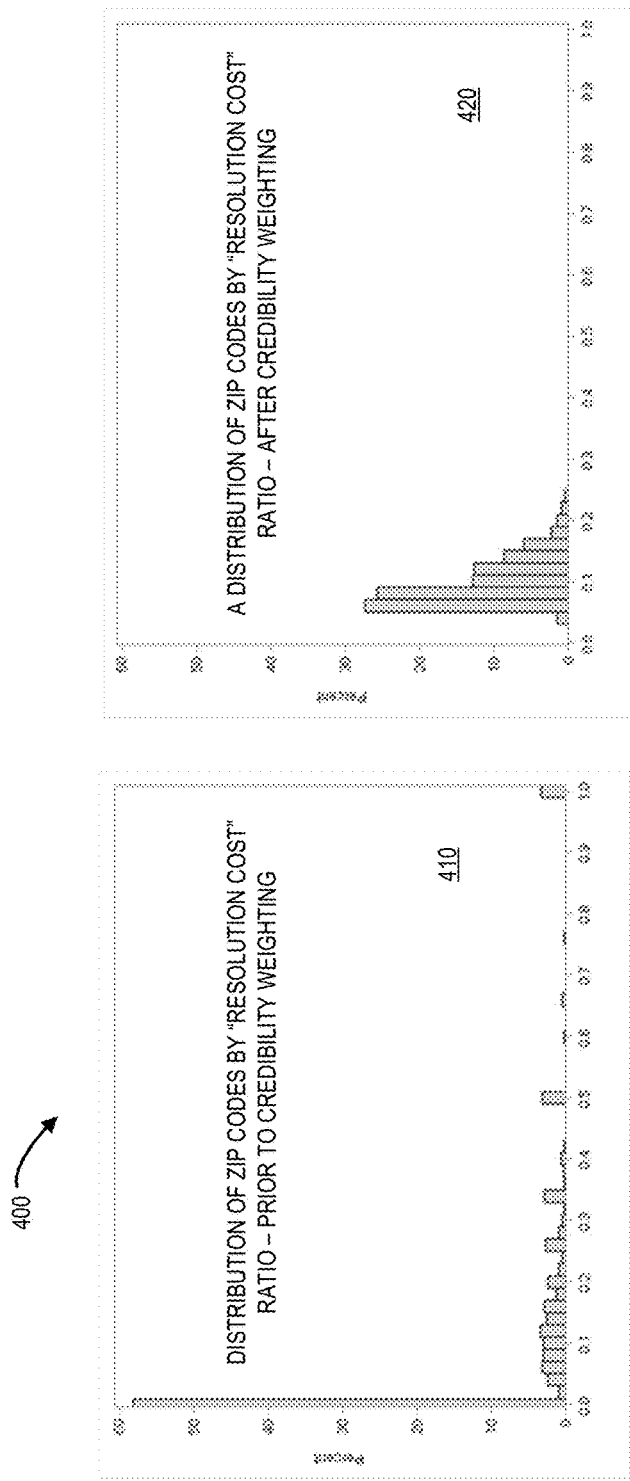
FIG. 4 is an illustration of distribution of ZIP codes by "resolution cost" ratio in accordance with some embodiments.

Note that when summarizing the policy level data at the ZIP code level, there might be a number of ZIP codes that have text flag ratios of 0, 1.0, 0.5, 0.25, etc. This may be indicative of a small number of claims within those ZIP codes, and thus has experience that would not be considered credible. To account for this lack of credibility at the ZIP level, experience from geographically similar regions might be used in order to add credibility at the ZIP code level according to some embodiments. FIG. 4 is an illustration 400 of distribution of ZIP codes by "resolution cost" ratio in accordance with some embodiments. In particular, a first graph 410 illustrates a distribution of ZIP codes by "resolution cost" ratio prior to credibility weighting and a second graph 420 illustrates a distribution of ZIP codes by "resolution cost" ratio after credibility weighting.

Prior to developing a credibility weighted estimate, a geographic hierarchy may be created. For example, starting from the most granular level, the levels might be established as follows:

A 5-Digit ZIP Code Level—This level may come directly from the electronic record variable associated with each policy. It may comprise the 5-Digit ZIP code that contains the highest amount of premium located within the risk state that contains the highest amount of premium.

A FIPS State and County Code Level—The ZIP codes may then be mapped to the Federal Information Processing Standard ("FIPS") state and county code, which is a five-digit code that uniquely identifies counties in the United States.

A Core Based Statistical Area ("CBSA") Level—This level is based on a CBSA which is a geographic area that consists of one or more counties anchored by an urban center of at least 10,000 people plus adjacent counties that are socioeconomically tied to the urban center by commuting. These include both metropolitan and micropolitan statistical areas.

A Combined Statistical Area ("CSA") Level—This level is based on a CSA which is composed of adjacent CBSAs that can demonstrate economic or social linkage.

A ZIP Code State Level—This level is the state to which the 5-digit ZIP code belongs (which can potentially differ from the risk state).

A Risk State Level—This level comes directly from the electronic record variable associated with each policy.

An Effective Year Level—This level is based on the policy effective year associated with each policy.

An "All" Level—This level represents the full dataset.

Figure 5:
FIG. 5 illustrates a geographic data hierarchy that might be established in accordance with some embodiments.

According to some embodiments, the hierarchy builds off itself at every level, starting from the least granular and going to most granular. For example, from the full dataset, one effective year is selected, then one state is selected, then one CSA, etc. This may help ensure that each effective combination is disjoint from one another and contains a clear hierarchy. FIG. 5 illustrates 500 a table 510 setting forth a geographic data hierarchy that might be established in accordance with some embodiments.

Given a hierarchy (geographic), a weight variable (text flag total claim counts), and a response variable (text flag ratio), a hierarchical credibility weighting methodology may be applied according to some embodiments. Letting level 1 be the least granular and Level n the most granular, the following formulas, calculated recursively starting with the most granular level, might be executed in accordance with some embodiments. Note that higher levels of the hierarchy may exclude the experience and credibility from the lower levels (e.g., to prevent double-counting the data).

If $\omega_i$ represents a weight for level i, $X_i$ represents a observed experience for level i, and K represents a credibility factor, then the credibility for level i might be calculated as:

$$Z_i = \frac{\omega_i}{\omega_i + K}.$$

Moreover, the observed experience for level i, excluding lower levels in the hierarchy, might be calculated as:

$$X_i' = \frac{X_i * \omega_i - X_{i+1} * \omega_{i+1}}{\omega_i - \omega_{i+1}}.$$

In addition, the credibility for level i, excluding lower levels in the hierarchy, might be calculated as:

$$Z_i' = Z_i - Z_{i+1}$$

and, finally, the credibility weighted estimate for level n may be calculated as:

$$\hat{X}_n = \Sigma_{i=1}^n X_i' * Z_i'.$$

Some embodiments described herein utilize the Buhlmann method to determine credibility. For example, the system may look at the variance across a population. More specifically, the system may look to see how much of the total variance is attributed to the variance of the expect values of each class (i.e., the variance of the hypothetical mean), and how much is attributed to the expected variance over all classes (i.e., the expected value of the process variance). Other embodiments might instead be associated with Bayesian credibility.

FIG. 6. is an example 600 of credibility analysis results for a particular credibility factor (K) of 1,500 that might be provided in accordance with any of the embodiments described herein. The example 600 includes a table 620 illustrating the results of such an approach when it applied to each text flag variable for each effective combination of the 5-digit ZIP code in the geographic hierarchy as previously described. The example of the attorney text flag ratio for the 5-digit ZIP code of 90210 in 2020 demonstrates the credibility weighting methodology. Full credibility is assumed for the observed value for the overall average and the final estimate is determined to be "15.8%." Note that additional credibility factors (e.g., 2,000 or 2,500 claims) might also be analyzed as appropriate. Consider, for example, the 5-digit ZIP code level for area code "90210." Because that region has only has a total of 25 claims identified (of which only 6, or 24.0% of the total number, satisfy the "resolution" cost condition), the level of credibility is relatively low (i.e., only 1.6%).

Figure 7:
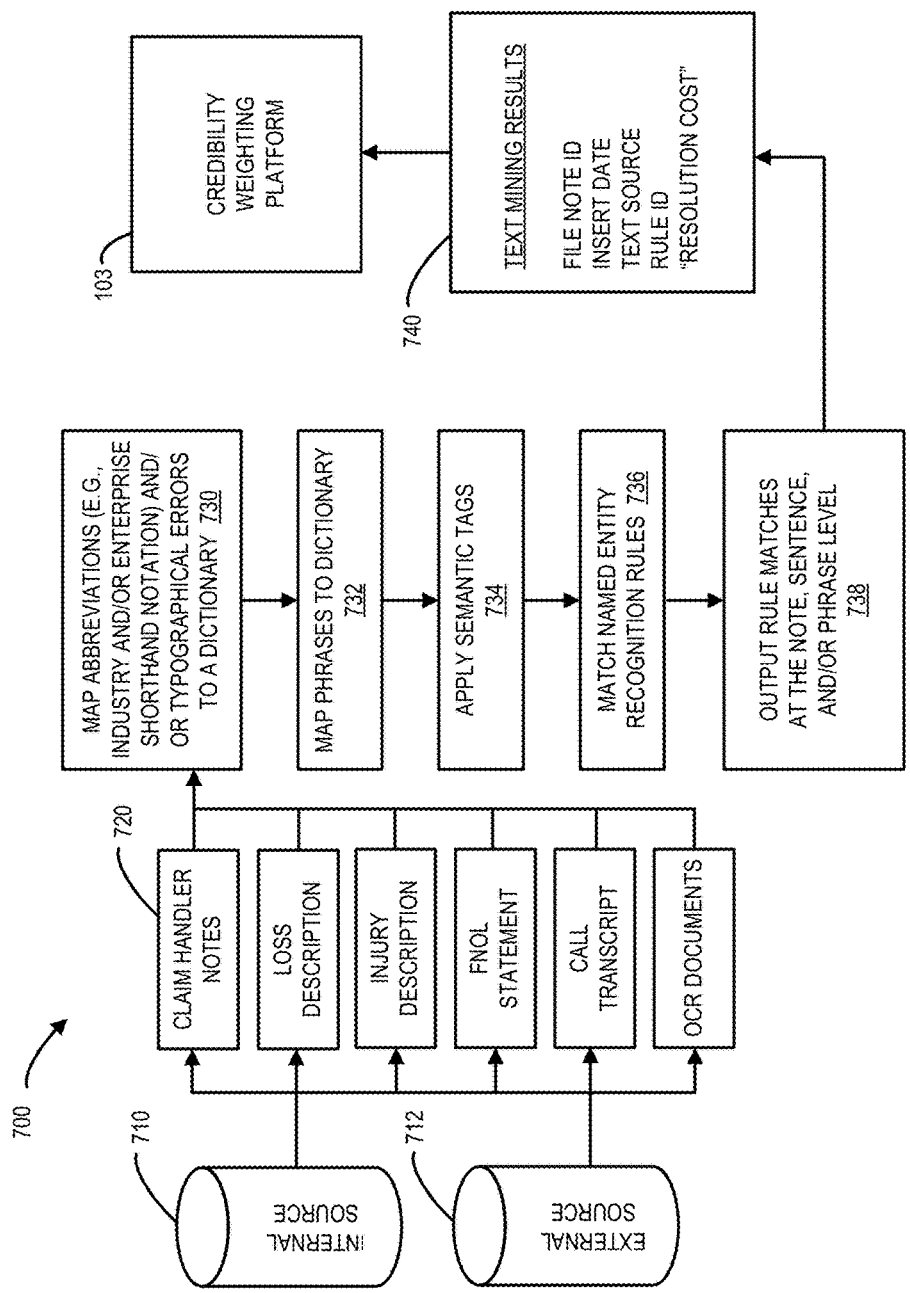
FIG. 7 comprises a process overview in accordance with some embodiments.

FIG. 7 comprises a process overview in accordance with some embodiments. In particular, FIG. 7 illustrates a data flow 700 according to some embodiments of the present invention. Initially, text data may be pulled from one or more internal sources 710 and/or external sources 712 (e.g., on a daily basis). The pulled data may be associated with, for example, various insurance applications and/or data types 720, such as claim handler notes, loss descriptions, injury descriptions, FNOL statements, call transcripts, and/or OCR documents. Note that other types of information (e.g., reports from a highway safety board) might also be processed.

The pulled data may then be processed in accordance with any of the embodiments described herein (e.g., in connection with a master domain). In particular, abbreviations (e.g., associated with industry and/or enterprise-specific shorthand and jargon) and/or typographical errors may be mapped to a dictionary 730, phrases may be mapped to a dictionary 732, semantic tags may be applied 734, and/or named entity recognition rules may be matched 736. As a result of such processing, rule matches may be output at the note, sentence, and/or phrase level 738. For example, entries or records may be inserted into a text mining results database 740 (e.g., including fields such as a file note identifier, date of insertion, a text source, a rule identifier, resolution cost status, etc.). Note that a single input file or record might result in multiple results being inserted into the database. The results database 740 might then be used by the credibility weighting platform 103 in accordance with any of the embodiments described herein.

According to some embodiments, such a data flow 700 may allow for the use of common domain dictionaries (e.g., including shorthand terms, common prescriptions, and/or insurance carrier names). Moreover, a composite named entity recognition rules library may provide for daily processing of text fields and rule changes may be tracked over time for analysis. In addition, performance monitoring might be performed in connection with indicator incidence rate trending and new rules can be introduced with minimal code changes. According to some embodiments, a batch process may create a history for new and/or changed rules associated with the data flow 700.

According to some embodiments, the text mining associated with the data flow is a "big data" activity that may use machine learning to sift through large amounts of unstructured data to find meaningful patterns to support business decisions. As used herein, the phrase "big data" may refer to massive amounts of data that are collected over time that may be difficult to analyze and handle using common database management tools. This type of big data may include business transactions, email messages, activity logs, and/or machine-generated data. In addition, data from sensors, unstructured text posted on the Internet, such as blogs and social media, may be included in embodiments described herein.

According to some embodiments, the text mining performed herein may be associated with hypothesis testing. For example, one or more theories may be provided (e.g., "the presence of a landlord increases chances of subrogation," "a pre-existing injury is a red flag for fraud," and/or "diabetes is a comorbidity that increases the duration of lost time claims"). Knowledge engineering may then translate common notation terms, correct typographical errors, and create smart tags for industry and scenario specific business context analysis. According to some embodiments, Natural Language Processing ("NLP") may parse text streams into phrases and Named Entity Recognition ("NER") rules may identify important concepts that are used to augment other structured data elements as predictor variables in models.

The NER rules may be stored in an NER rule library and may include individual indicators. For example, indicators associated with a subrogation analysis might include the following words or phrases: animal bite, attorney, carrier, contractor, landlord, low subrogation, motor vehicle accident, no subrogation, off premises, responsible party, self-inflicted, third party, and/or zero paid. As other examples, indicators associated with a fraud detection analysis might include the following words or phrases: disputed injury, no evidence, pre-existing condition, prior history, recent hire, terminated, unhappy, un-witnessed injury, claimant lacks documentation, claimant not employee, claimant paid in cash, no Social Security number, employer paid un-reported bill, employer won't confirm information, hazardous material, and/or excluded business. As still other examples, indicators associated with a recovery factor analysis might include: alcohol, complications, diabetes, high blood pressure, narcotics, pre-existing condition, obesity, osteoarthritis, smoking, substance abuse, and/or elderly care.

In some embodiments, the text mining described herein may be associated with insight discovery wherein unsupervised data mining techniques may be used to discover common patterns in data. For example, highly recurrent themes may be classified, and other concepts may then be highlighted based on a sense of adjacency to these recurrent themes. In some cases, cluster analysis and drilldown tools may be used to explore the business context of such themes. For example, sentiment analysis may be used to determine how an entity is currently perceived and/or the detection of a real-world event may be triggered (e.g., it might be noted that a particular automobile model is frequently experiencing a particular unintended problem).

Figure 8A:
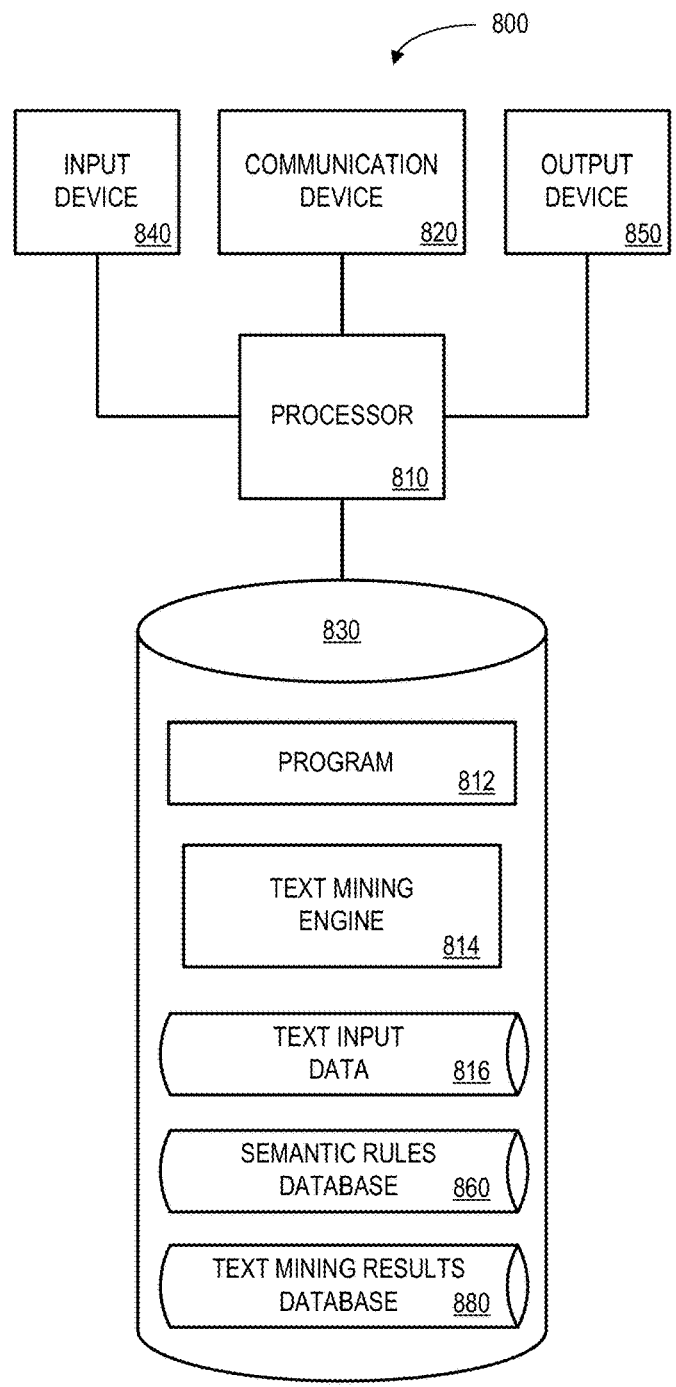
FIG. 8A is block diagram of a platform according to some embodiments of the present invention.

The embodiments described herein may be implemented using any number of different hardware configurations. For example, FIG. 8A illustrates a platform or apparatus 800 that may be, for example, associated with the text mining platform 150 and/or the credibility weighting platform 103 of FIG. 1. The apparatus 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more text sources and/or insurance applications. The apparatus 800 further includes an input device 840 (e.g., a mouse and/or keyboard to define semantic rules) and an output device 850 (e.g., a computer monitor to display reports and credibility weighting results).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 812 and/or a text mining engine 814 for controlling the processor 810. The processor 810 performs instructions of the programs 812, 814, and thereby operates in accordance with any of the embodiments described herein. For example, the processor 810 may aggregate and map received text input data to create composite text input data for electronic records. The processor 810 may also automatically detect a semantic event in the composite text input data triggered by a semantic rule and associated semantic tag. According to some embodiments, the processor 810 may flag the detected semantic event as meeting a pre-determined condition and update a text mining result database, responsive to the flag, by adding an entry to the database identifying the detected semantic event and the triggering semantic rule. The processor 810 may transmit an indication associated with the event based on the associated data in the text mining result database, such as by transmitting the indication to a back-end application computer server that establishes a hierarchy for multiple elements of the electronic records. The processor 810 may also determine a weight variable and response variable for each element in the established hierarchy, and apply a hierarchical credibility weighting methodology to the elements of the electronic records from level 1, representing the least granular level in the hierarchy, to level n, representing the most granular level in the hierarchy, calculated recursively from level n, to determine a final estimated credibility for the electronic records based on the weight variable and response variable. The processor 810 may then output an indication of the final estimated credibility for the electronic records.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the text mining apparatus 800 from another device; or (ii) a software application or module within the text mining apparatus 800 from another software application, module, or any other source.

In some embodiments (such as shown in FIG. 8), the storage device 830 further stores text input data 816, a semantic rules database 860, and the text mining results database 880. Examples of databases that may be used in connection with the apparatus 800 will now be described in detail with respect to FIGS. 8B and 8C. Note that the database described herein is only one example, and additional and/or different information may be stored therein. Moreover, various databases might be split or combined in accordance with any of the embodiments described herein.

Referring to FIG. 8B, a table is shown that represents the semantic rules database 860 that may be stored at the apparatus 800 according to some embodiments. The table may include, for example, entries identifying rules and algorithms that may facilitate text mining. The table may also define fields 862, 864, 866 for each of the entries. The fields 862, 864, 866 may, according to some embodiments, specify: a semantic rule identifier 862, a rule description 864, and one or more semantic tags 866 for each rule. The semantic rules database 860 may be created and updated, for example, based on information received from an operator or administrator.

The semantic rule identifier 862 may be, for example, a unique alphanumeric code identifying logic that may be applied during text mining. The rule description 864 may describe the rule and the one or more semantic tags 866 may define when the rule is triggered. For example, the presence of the word "DOGS" in a claim file might trigger the semantic rule associated with identifier "SR_10002" to indicate that an "ANIMAL_BITE" might be associated with that claim file. According to some embodiments, the semantic rules database 860 may store multiple versions of a semantic rule (and different rule versions may be associated with different text mining results databases 500 versions).

Referring to FIG. 8C, a table is shown that represents the text mining results database 880 that may be stored at the apparatus 800 according to some embodiments. The table may include, for example, entries identifying results of a text mining operation. The table may also define fields 882, 884, 886, 888, 890 for each of the entries. The fields 882, 884, 886, 888, 890 may, according to some embodiments, specify: a text mining result identifier 882, a loss event 884, a date 886, a rule identifier 888, and a claim identifier 890. The text mining results database 880 may be created and updated, for example, based on an analysis of text input data received from multiple sources. Note that text mining operations and analysis might be performed on historical text input data in addition to, or instead of, current text input data.

The text mining result identifier 882 may be, for example, a unique alphanumeric code identifying a result of text analysis. The loss event 884 might categorize a cause associated with the event and the date 886 might indicate when the loss occurred. The rule identifier might indicate which rule resulted in the entry being created and may be based on, or associated with, the semantic rule identifier 862 stored in the semantic rule database 860. The claim identifier 890 might indicate a claim file associated with the event and/or an associated insurance policy. Note that other identifiers may be stored in the text mining results database 880 in addition to, or instead of, the claim identifier 890. Examples of such other identifiers include a party identifier, a policy identifier, an entity identifier, a tax identifier, a physician identifier, etc. Moreover, credibility weighting data might be stored in the text mining results database 880 (e.g., after it has been calculated by a back-end application computer server).

Figure 9:
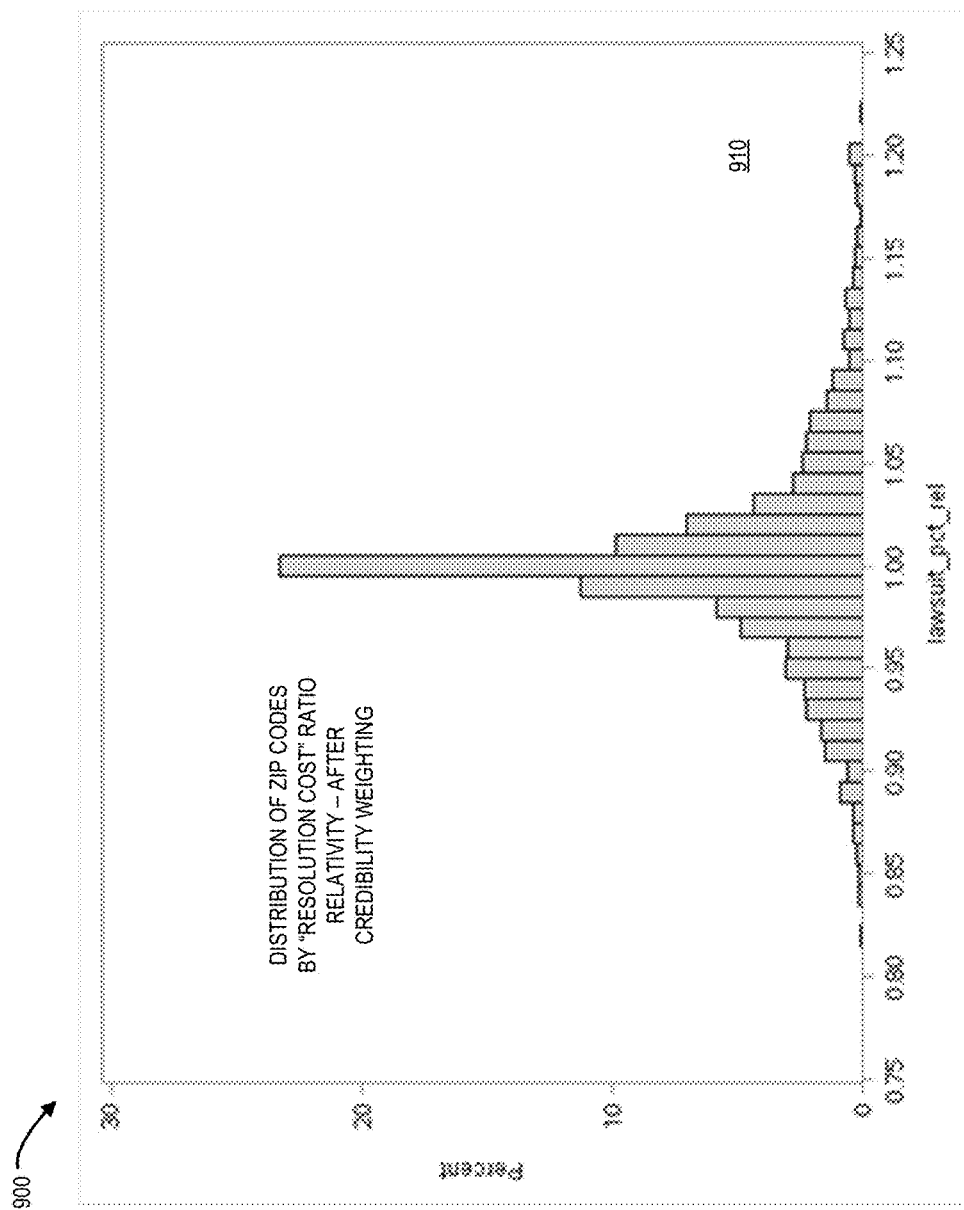
FIG. 9 is an illustration of the distribution of ZIP codes by "resolution cost" ratio relativity according to some embodiments.

According to some embodiments, relatives may be derived in addition to calculating the credibility weighted experience of the text flag variables. The credibility weighted values of the full hierarchy may be set relative to the credibility weighted values of the hierarchy down to the state level (e.g., "All," "Effective Year," and "Risk State"). This may have the effect of normalizing the experience of the 5-digit ZIP code to that of the state it is located in. Thus, when the 5-digit ZIP code has credible experience that differs from that of the rest of the state, it may be reflected by having a relativity that is either larger or smaller than 1.0. If the 5-digit ZIP code experience is not credible, then the relativity may be close to 1.0. FIG. 9 is an illustration 900 of the distribution of ZIP codes by "resolution cost" ratio relativity according to some embodiments. In particular, the illustration 900 includes a graph 910 showing the distribution after credibility weighting has been performed in accordance with some embodiments. Note that this may provide a relative ranking of the 5-digit ZIP codes within each state and may also remove the potential correlation to the state control variable. Some or all of the information in the illustration 900 of FIG. 9 might be used, for example, in a risk score calculation for an insurance enterprise.

Figure 10:
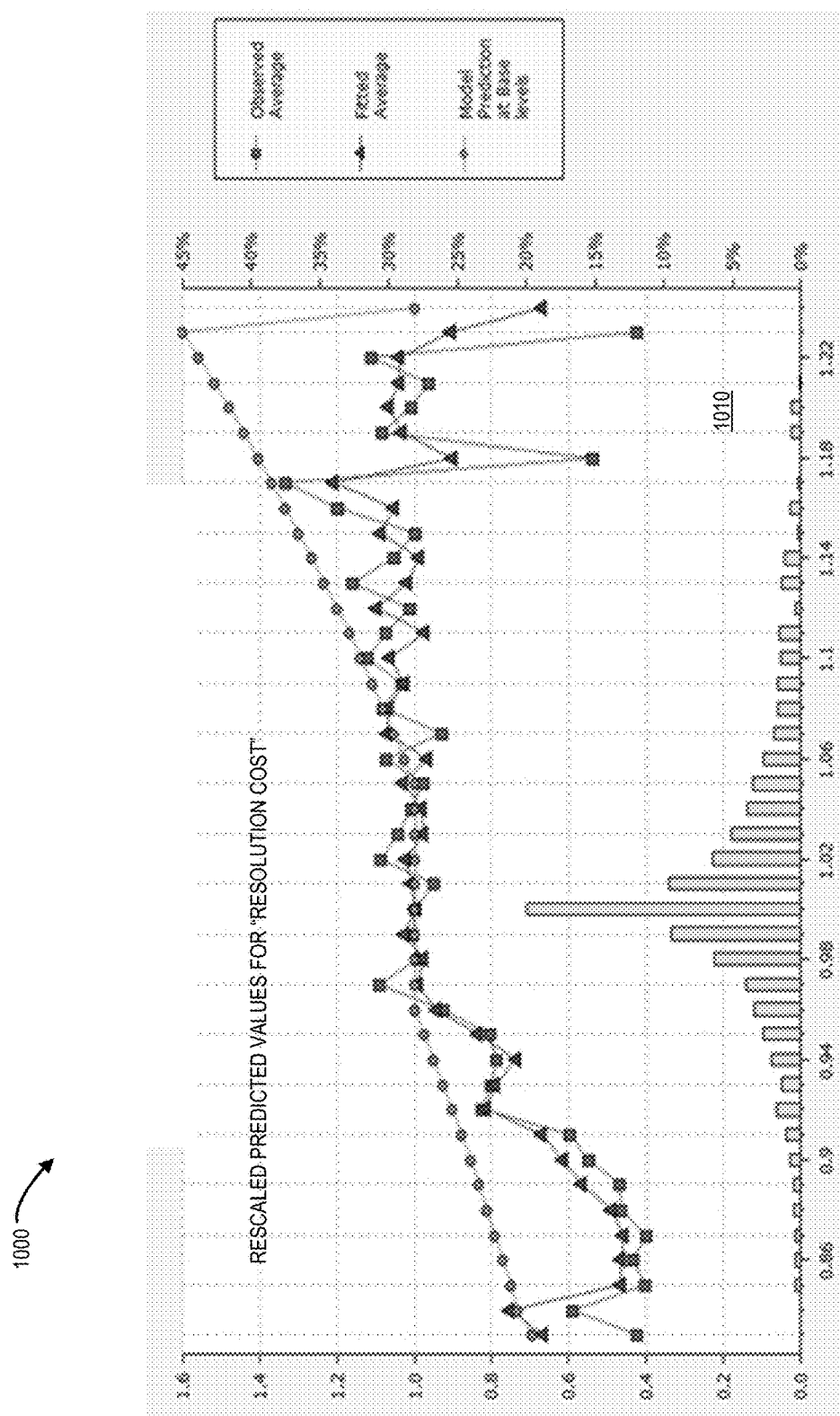
FIG. 10 represents re-scaled predicted values associated with an observed average, a fitted average, and a model prediction at base levels in accordance with some embodiments.

FIG. 10 represents 1000 re-scaled predicted values associated with an observed average, a fitted average, and a model prediction at base levels in accordance with some embodiments. In particular, a graph 1010 illustrates re-scaled predicted values for "resolution cost" claims. According to some embodiments, credibility weighting might be performed in connection with a risk score model (e.g., a workers' compensation risk score model). For example, a credibility-weighted resolution cost ratio relativity might have impact in providing within-state loss ratio differentiation. Moreover, 5-digit ZIP codes with relativities less than 1.0 may have lower loss ratios while those with relativities above than 1.0 have higher loss ratios.

Figure 11:
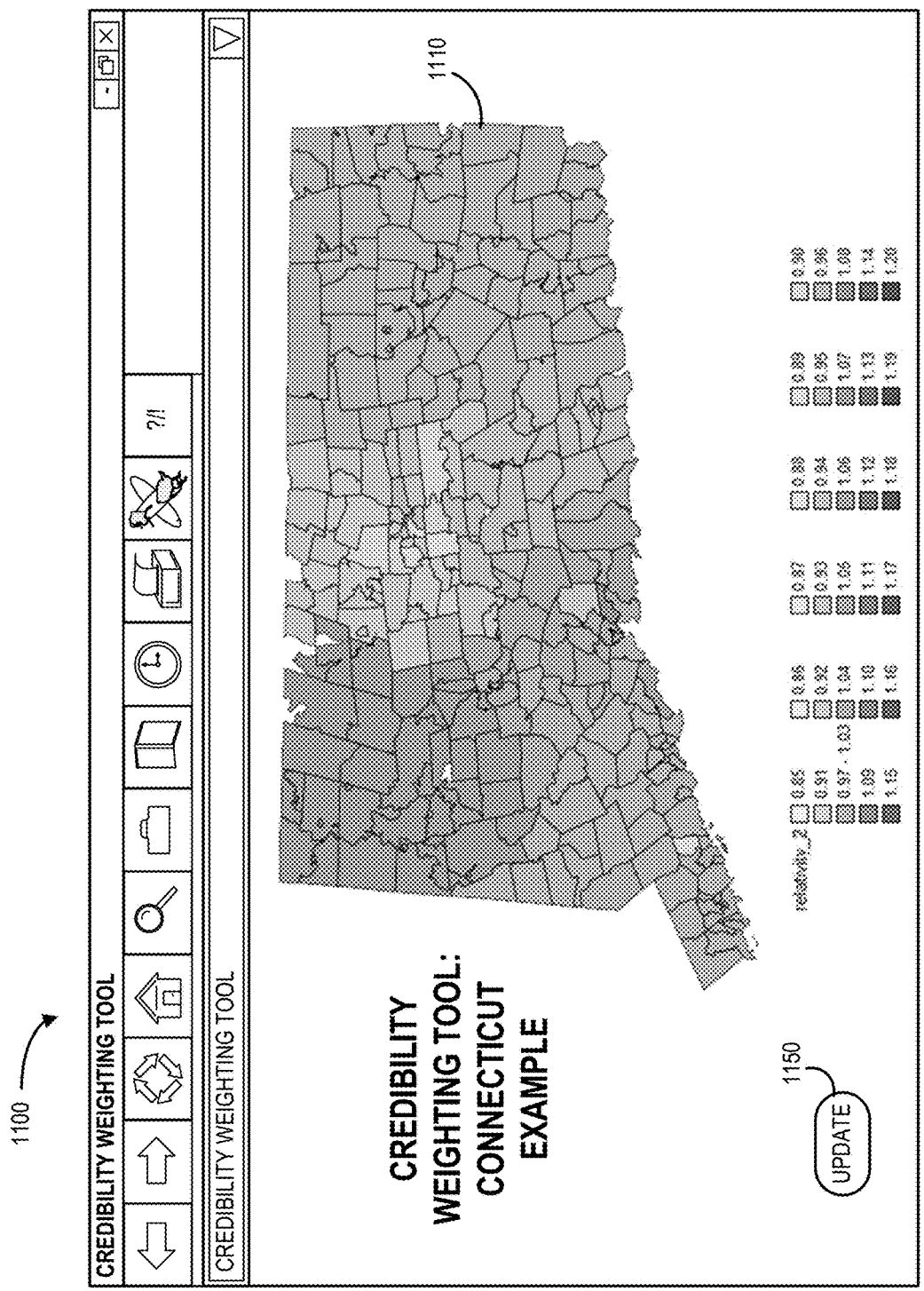
FIGS. 11 and 12 are credibility weighting tool interactive map displays according to some embodiments.
Figure 12:
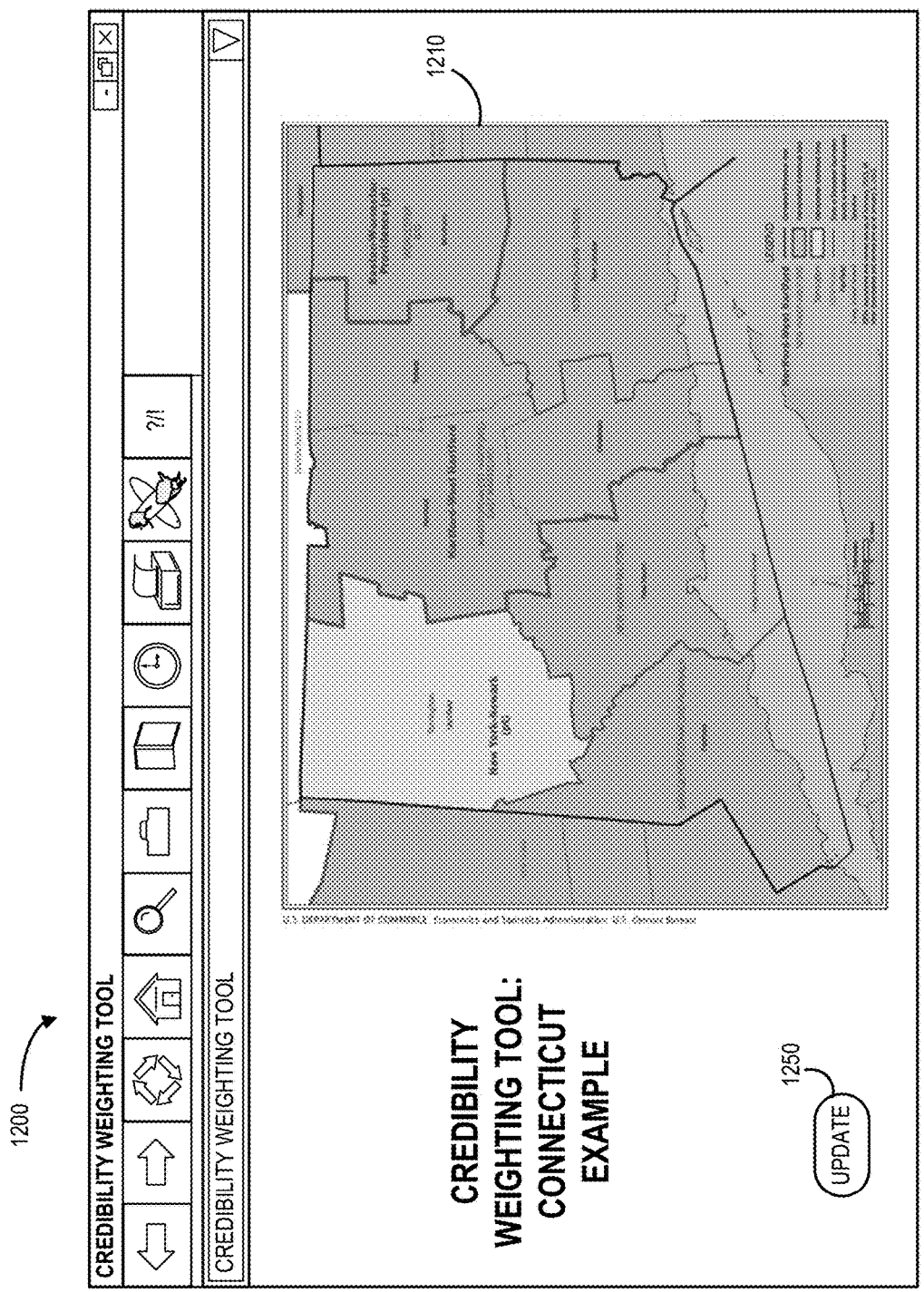

FIG. 11 is a credibility weighting tool example display 1100 according to some embodiments. In the illustration of FIG. 11, hypothetical credibility-weighted "resolution cost" ratios relatives are displayed for Connecticut for a policy effective year of 2020. Note that the relatives range from 0.9 to 1.09. According to some embodiments, a user might select a graphically displayed element to see more information about that element and/or select an update icon 1150 to refresh the display with new data. FIG. 12 is another credibility weighting tool example display 1200 according to some embodiments. In the illustration of FIG. 12, counties, CBSAs, and CSAs for Connecticut are illustrated. According to some embodiments, a user might select a graphically displayed element to see more information about that element and/or select an update icon 1250 to refresh the display with new data.

Figure 13:
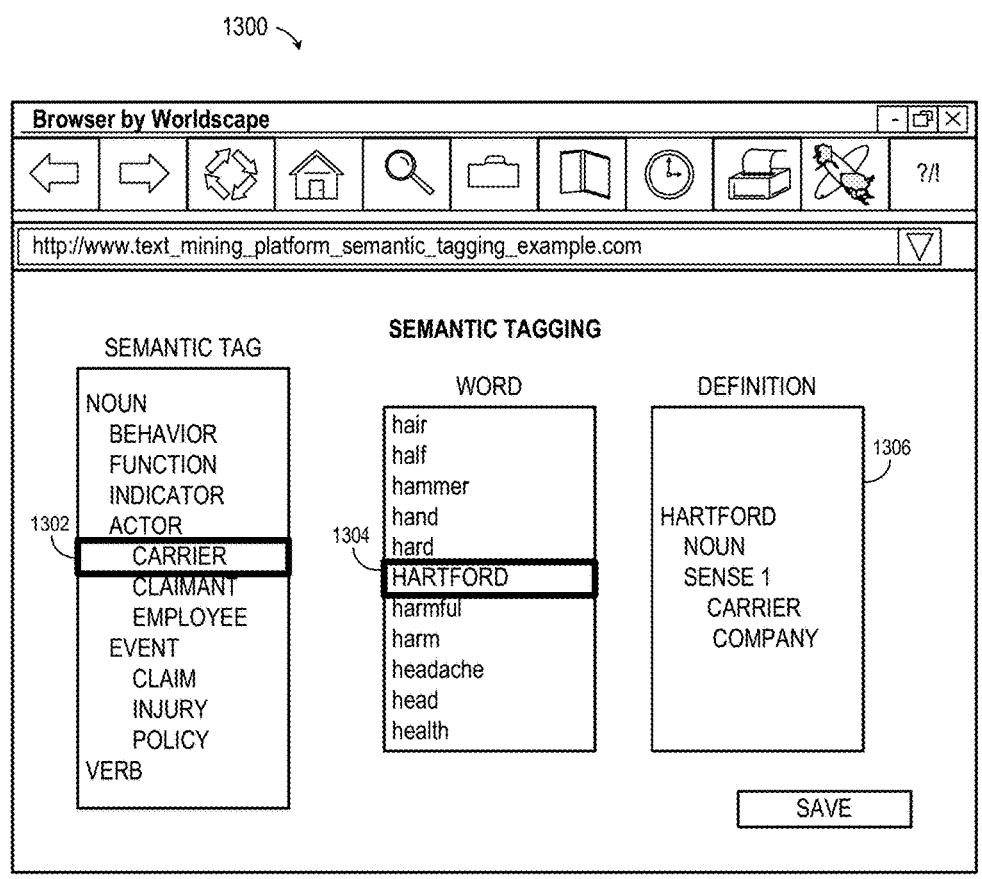
FIG. 13 is a text mining semantic tagging display in accordance with some embodiments.

User displays might also be provided to facilitate text mining in connection with any of the embodiments described here. For example, FIG. 13 illustrates a semantic tagging graphical user interface 1300 in accordance with some embodiments of the present invention. The semantic tagging interface 1300 may let the administrator select one or more words 1304 in a library as a "semantic tag" 1302 and/or provide a definition 1306 (e.g., a hierarchy of data elements may define the word "Hartford" as an insurance "carrier" and "company" as illustrated in FIG. 13).

Figure 14:
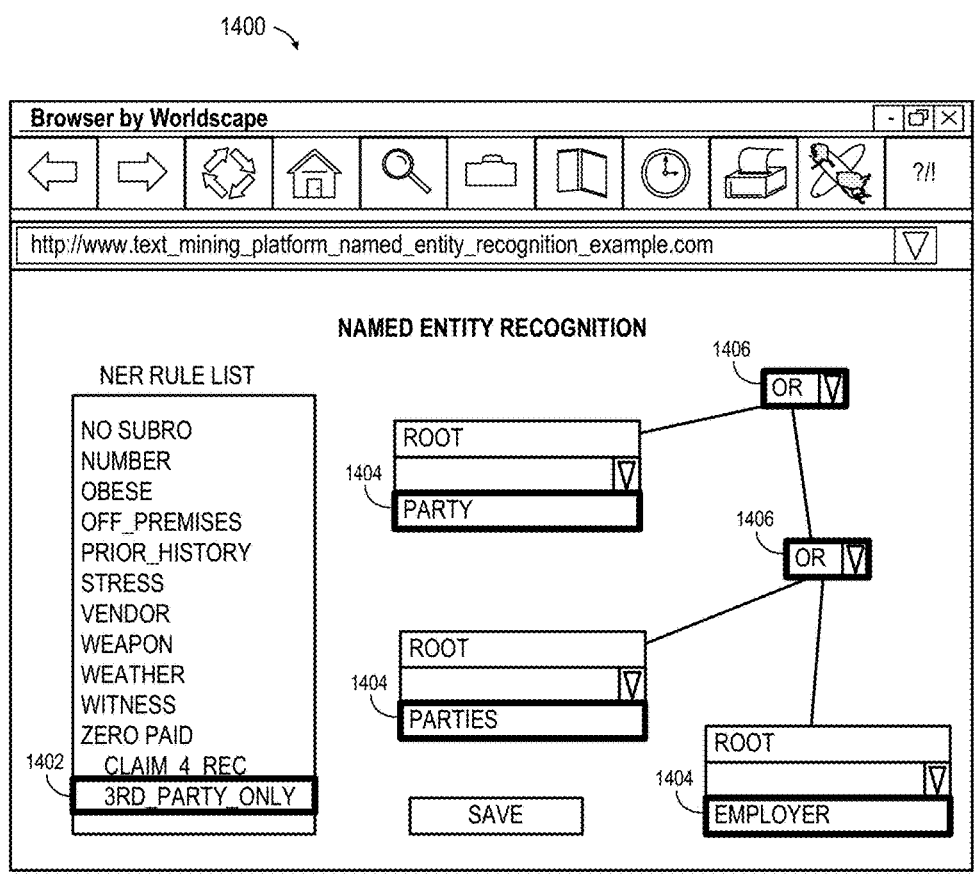
FIG. 14. is a text mining named entity recognition display according to some embodiments.

FIG. 14 illustrates a named entity recognition graphical user interface 1400 that may be provided via the administrator interface 770 in accordance with some embodiments of the present invention. In particular, the named entity recognition graphical user interface 1400 may let the administrator select a named entity recognition rule 1402 from a list of rules. Various root words 1404 may then be tied together via logical connectors 1406 to define the selected rule (e.g., the presence of "party" or "parties" or "employer" may trigger a "3RD_PARTY_ONLY" rule as illustrated in FIG. 14.

Figure 15:
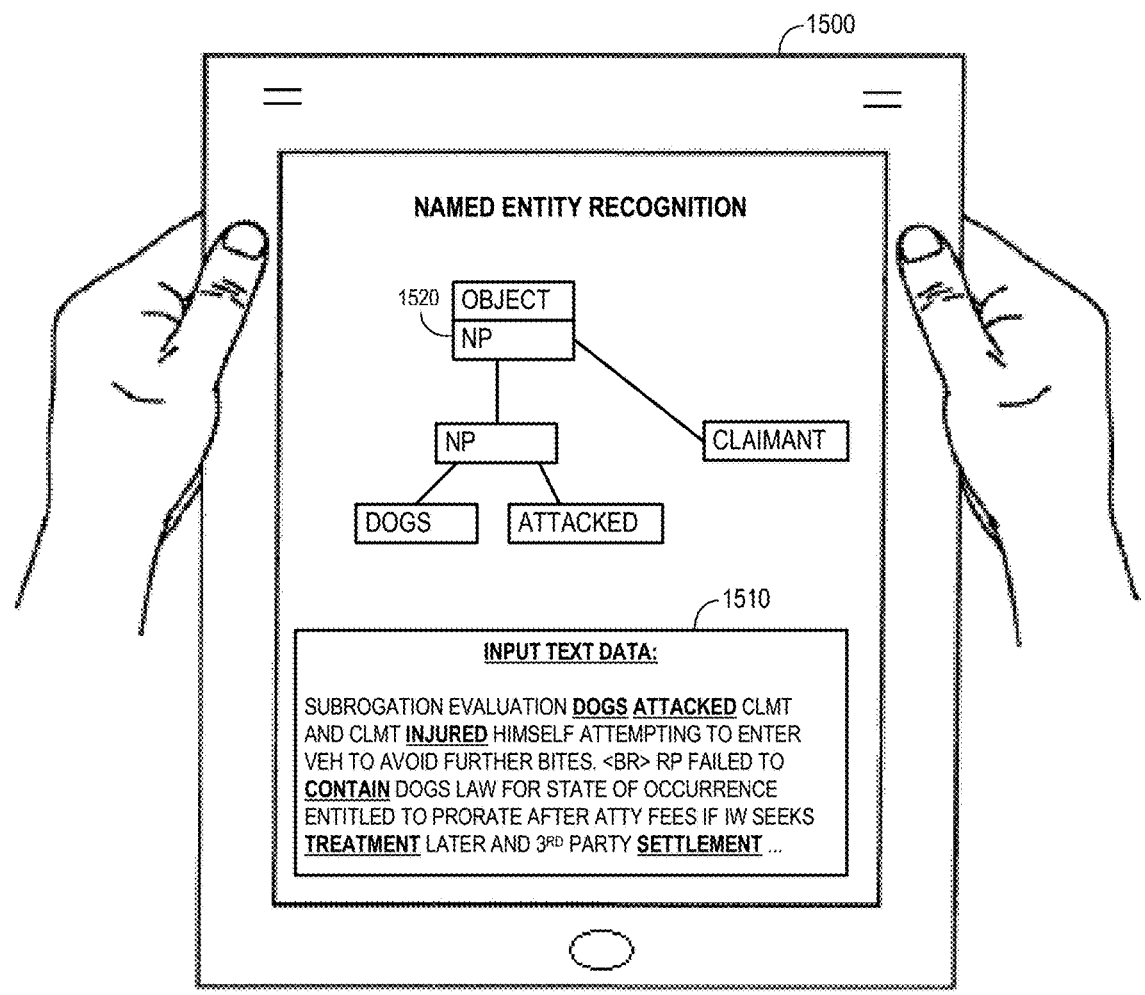
FIG. 15 illustrates a wireless or tabular device in accordance with some embodiments of the present invention.

FIG. 15 illustrates a wireless or tabular device 1500 displaying results 1515 of a named entity recognition process in accordance with some embodiments of the present invention. For example, in some embodiments, the device 1500 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity.

The device 1500 may be used to graphically tie together various Noun Phrases ("NP") 1520 in association with sentence subjects, clauses, objects, etc. For example, the results 1515 illustrated in FIG. 15 display the triggered words in bold and underlined text (e.g., "dogs," "attacked," "injured," etc.). In this way, the interfaces described herein may be used to map typographical errors in the text input data to a word dictionary, map phrases in the text input data to a phrase dictionary, apply semantic tags to the mapped phrases, match named entity recognition rules based on the applied semantic tags, and/or output rule matches at a level representing at a note level, a sentence level, and/or a phrase level. This enhanced information may then be used to facilitation predictions of volatility for insurance claims in accordance with any of the embodiments described herein. The text mining information might be associated with, by way of examples only, subrogation related data (e.g., a self-inflicted injury indication, detection of a landlord, etc.); fraud related data (e.g., a lack of evidence, a dissatisfied party, a claimant who was paid in cash, etc.); and/or recover factors (e.g., diabetes, tobacco use, substance abuse, divorce, etc.).

Thus, embodiments may utilize text mining to help determine credibility weighting information. Such information might, for example, help inform pricing decisions, resource allocation, risk engineering, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with workers' compensation insurance policies and associated claims. Note, however, that other types of business and insurance data may also benefit from the invention. For example, embodiments of the present invention may be used in connection with automobile insurance policies, etc.

Moreover, although some embodiments have been described with respect to particular text mining approaches, note that any of the embodiments might instead be associated with other text processing techniques. For example, natural language processing may operate to mine certain characteristic information from various social networks to determine whether a party is engaging in certain risky behavior or providing high risk products. It is also contemplated that embodiments may process recommendations in one or more languages, such English, French, Arabic, Spanish, Chinese, German, Japanese and the like. In an exemplary embodiment, a system can be employed for sophisticated text analyses, wherein text can be recognized irrespective of the text language. The relationships between the various words/phrases can be clarified by using a rules engine for classifying words/phrases as a predictor of certain underwriting risk.

According to some embodiments, text data may be used in conjunction with one or more predictive models to take into account a large number of underwriting and/or other parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior text data and outcomes known to the insurance company. The specific text data and outcomes analyzed may vary depending on the desired functionality of the particular predictive model. The particular text data parameters selected for analysis in the training process may be determined by using regression analysis and/or other statistical techniques known in the art for identifying relevant variables and associated weighting factors in multivariable systems. The parameters can be selected from any of the structured data parameters stored in the present system, whether the parameters were input into the system originally in a structured format or whether they were extracted from previously unstructured text, such as from big data.

In the present invention, the selection of weighting factors (either on a keyword level or a text source level) may improve the predictive power of the text mining. For example, more reliable text sources may be associated with a higher weighting factor, while newer or less reliable sources might be associated with a relatively lower weighting factor.

Figure 16:
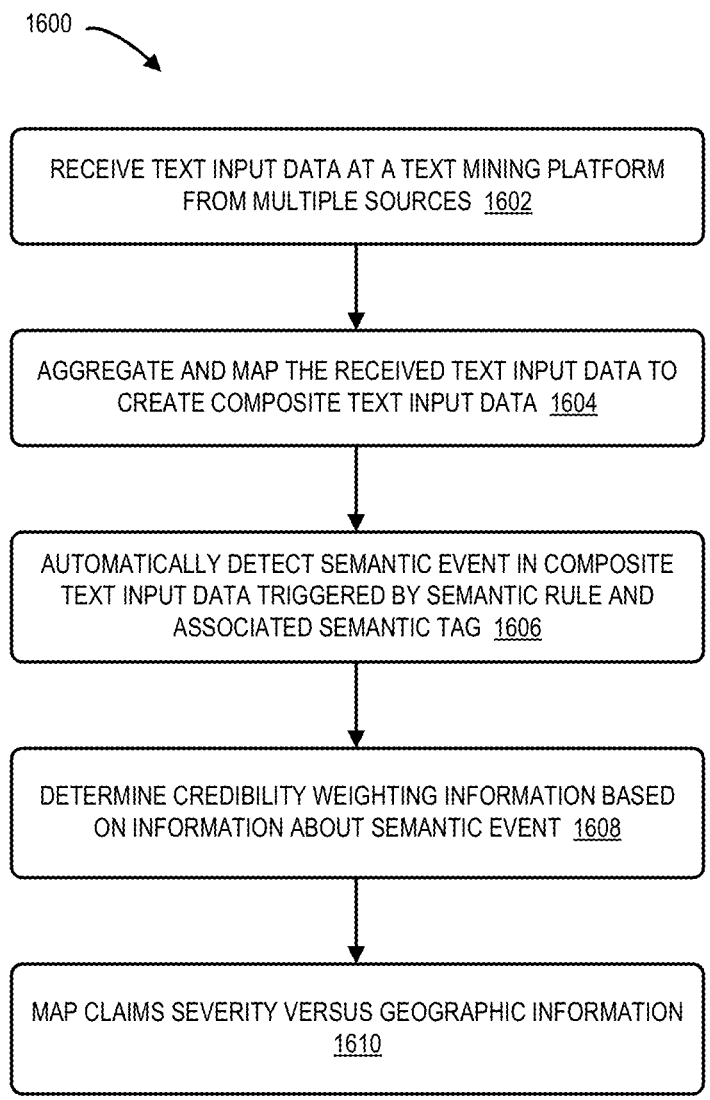
FIG. 16 is a high level flow chart of a claims severity analysis in accordance with some embodiments.

Although some embodiments have been described with respect to the use of credibility information to describe data elements, note that credibility information may be used in connection with many types of decisions. For example, FIG. 16 illustrates a workers' compensation insurance policy renewal method 1600 in accordance with some embodiments. At 1602, text input data may be received at a text mining platform from multiple sources. At 1604, the text mining platform may aggregate and map the received text input data to create composite text input data. At 1606, the text mining platform may automatically detect a semantic event in the composite text input data triggered by a semantic rule and associated semantic tag. At 1608, a back-end application computer server may determine credibility weighting information based on information about the semantic event. At 1610, the system may map severity versus geographic information using the credibility information. This information might be used, for example, to establish a geographic proxy for claim litigiousness and/or adverse claim severity. As other examples, the information may be used in connection with risk engineering, resource allocation, etc.

Figure 17:
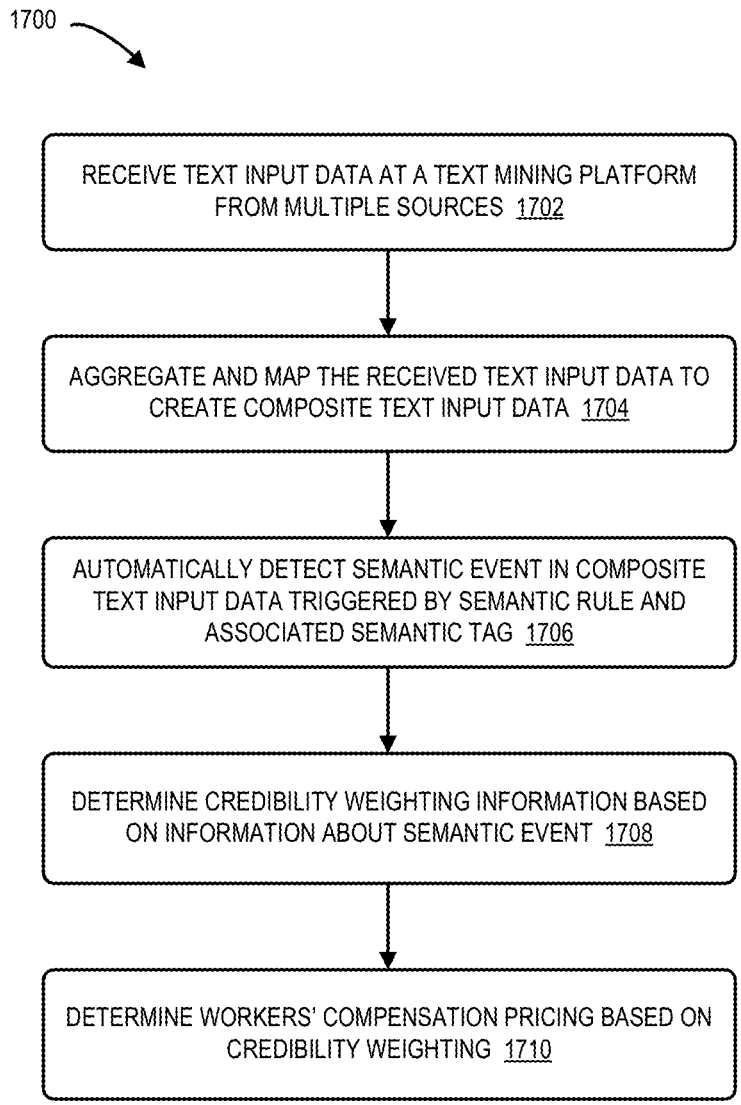
FIG. 17 is a high level flow chart of a workers' compensation insurance pricing process sin accordance with some embodiments.

FIG. 17 illustrates an insurance pricing and appetite direction method 1700 in accordance with some embodiments. At 1702, text input data may be received at a text mining platform from multiple sources. At 1704, the text mining platform may aggregate and map the received text input data to create composite text input data. At 1706, the text mining platform may automatically detect a semantic event in the composite text input data triggered by a semantic rule and associated semantic tag. At 1708, a back-end application computer server may determine credibility weighting information based on information about the semantic event. At 1710, the system may determine workers' compensation pricing based on the credibility weighting information. For example, a workers' compensation insurance policy associated with unusually adverse claims region to a credible degree (as provided in accordance with any of the embodiments described herein) might be priced higher as compared to an insurance policy associated with a less adverse claims region. Note that other types of insurance might utilize credibility weighting including general liability, group benefits, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system for determining a credibility weighting associated with electronic records, comprising:
    a text mining platform, including:
        a text mining communication device to receive text input data associated with the electronic records;
        a text mining processor coupled to the text mining communication device; and
        a text mining storage device in communication with said text mining processor and storing instructions adapted to be executed by said text mining processor to:
            (i) aggregate and map the received text input data to create composite text input data,
            (ii) automatically detect a semantic event in the composite text input data triggered by a semantic rule and associated semantic tag,
            (iii) flag the detected semantic event as meeting a pre-determined condition,
            (iv) update a text mining result database, responsive to the flag, by adding an entry to the database identifying the detected semantic event and the triggering semantic rule, and
            (v) transmit an indication associated with the event based on the associated data in the text mining result database; and
    a back-end application computer server coupled to the text mining platform, including:
        a back-end communication device to receive the indication for the electronic record transmitted by the text mining platform;
        a back-end processor coupled to the back end communication device; and
        a back-end storage device in communication with said back-end processor and storing instructions adapted to be executed by said back-end processor to:
            (i) establish a hierarchy for multiple elements of the electronic records,
            (ii) determine a weight variable and response variable for each element in the established hierarchy,
            (iii) apply a hierarchical credibility weighting methodology to the elements of the electronic records from level 1, representing the least granular level in the hierarchy, to level n, representing the most granular level in the hierarchy, calculated recursively from level n, to determine a final estimated credibility for the electronic records based on the weight variable and response variable, wherein $\omega_i$ represents a weight for level i, $X_i$ represents an observed experience for level i, K represents a credibility factor, and the credibility for level i is calculated as:

$$Z_i = \frac{\omega_i}{\omega_i + K},$$

and
            (iv) output an indication of the final estimated credibility for the electronic records.

2. The system of claim 1, wherein if there is not enough data associated with a granular level in the hierarchy to be credible, then the level of granularity is decreased until enough data is obtained for the level to be credible.

3. The system of claim 1, wherein the semantic event is associated with at least one of: (i) a word, (ii) a phrase, (iii) a shorthand term, (iv) a course of action, and (v) an enterprise name.

4. The system of claim 1, wherein the triggering semantic rule is associated with at least one of: (i) a noun, (ii) a verb, (iii) a definition, (iv) a semantic tree, (v) a named entity recognition rule, (vi) a root, (vii) a noun phrase, (viii) a prepositional phrase, and (ix) a verb phrase.

5. The system of claim 4, wherein the triggering semantic rule was defined by an administrator using a graphical user interface.

6. The system of claim 1, wherein the observed experience for level i, excluding lower levels in the hierarchy, is calculated as:

$$X_i' = \frac{X_i * \omega_i - X_{i+1} * \omega_{i+1}}{\omega_i - \omega_{i+1}}.$$

7. The system of claim 6, wherein the credibility for level i, excluding lower levels in the hierarchy, is calculated as:

$$Z_{i'} = Z_i - Z_{i+1}.$$

8. The system of claim 7, wherein the credibility weighted estimate for level n is calculated as:

$$\hat{X}_n = \Sigma_{i=1}^n X_{i'} * Z_{i'}.$$

9. The system of claim 1, wherein the electronic records are associated with insurance claims, the weight variable comprises a text flag total claim count, and the response variable comprises a text flag ratio.

10. The system of claim 9, wherein the insurance claims comprise workers' compensation insurance claims.

11. The system of claim 10, wherein the final estimated credibility is associated with at least one of claim litigiousness and adverse claim severity summarized at a geographic level.

12. The system of claim 11, wherein the established hierarchy includes at least four of: (i) effective year, (ii) a risk state, (iii) a Combined Statistical Area ("CSA"), (iv) a Core Based Statistical Area ("CBSA"), (v) a Federal Information Processing Standard ("FIPS") code, (vi) a county, and (vii) a five-digital ZIP code.

13. The system of claim 1, wherein higher levels of the established hierarchy exclude the experience and credibility from the lower levels, credibility weighted values of the full hierarchy are set relative to the credibility weighted values of the hierarchy to normalize the data, and the final estimated credibility is used in connection with at least one of: (i) an insurance pricing process, and (ii) a risk score model.

14. The system of claim 1, wherein the text input data is associated with at least one of: (i) an insurance claim file, (ii) an insurance claim note, (iii) a medical report, (iv) a police report, (v) social network data, (vi) big data information, (vii) a loss description, (viii) an injury description, (ix) a first notice of loss statement, (x) telephone call transcript, (xi) optical character recognition data, (xii) third-party data, and (xiii) a governmental agency.

15. A computer-implemented method for determining a credibility weighting associated with electronic records, comprising:
  aggregating and mapping, by a text mining platform processor, received text input data to create composite text input data for the electronic records;
  automatically detecting, by the text mining platform processor, a semantic event in the composite text input data triggered by a semantic rule and associated semantic tag;
  flagging, by the text mining platform processor, the detected semantic event as meeting a pre-determined condition;
  updating, by the text mining platform processor, a text mining result database, responsive to the flag, by adding an entry to the database identifying the detected semantic event and the triggering semantic rule;
  transmitting, by the text mining platform processor, an indication associated with the event based on the associated data in the text mining result database;
  establishing, by a back-end application computer processor, a hierarchy for multiple elements of the electronic records;
  determining, by the back-end application computer processor, a weight variable and response variable for each element in the established hierarchy;
  applying, by the back-end application computer processor, a hierarchical credibility weighting methodology to the elements of the electronic records from level 1, representing the least granular level in the hierarchy, to level n, representing the most granular level in the hierarchy, calculated recursively from level n, to determine a final estimated credibility for the electronic records based on the weight variable and response variable, wherein $\omega_i$ represents a weight for level i, $X_i$ represents an observed experience for level i, K represents a credibility factor, and the credibility for level i is calculated as:

$$Z_i = \frac{\omega_i}{\omega_i + K};$$

and
  outputting, from the back-end application computer processor, an indication of the final estimated credibility for the electronic records.

16. The method of claim 15, wherein the observed experience for level i, excluding lower levels in the hierarchy, is calculated as:

$$X_i' = \frac{X_i * \omega_i - X_{i+1} * \omega_{i+1}}{\omega_i - \omega_{i+1}}.$$

17. The method of claim 16, wherein the credibility for level i, excluding lower levels in the hierarchy, is calculated as:

$$Z_i' = Z_i - Z_{i+1}, \text{ and}$$

the credibility weighted estimate for level n is calculated as:

$$\hat{X}_n = \Sigma_{i=1}^{n} X_i' * Z_i'.$$

18. The method of claim 15, wherein the electronic records are associated with insurance claims, the weight variable comprises a text flag total claim count, and the response variable comprises a text flag ratio.

19. A system for determining a credibility weighting associated with electronic records, comprising:
  a text mining platform, including:
    a text mining communication device to receive text input data associated with the electronic records;
    a text mining processor coupled to the text mining communication device; and
    a text mining storage device in communication with said text mining processor and storing instructions adapted to be executed by said text mining processor to:
      (i) aggregate and map the received text input data to create composite text input data,
      (ii) automatically detect a semantic event in the composite text input data triggered by a semantic rule and associated semantic tag, and
      (iii) transmit an indication associated with the event based on the associated data in the text mining result database; and
  a back-end application computer server coupled to the text mining platform, including:
    a back-end communication device to receive the indication for the electronic record transmitted by the text mining platform;
    a back-end processor coupled to the back end communication device; and
    a back-end storage device in communication with said back-end processor and storing instructions adapted to be executed by said back-end processor to:
      (i) establish a hierarchy for multiple elements of the electronic records,
      (ii) determine a weight variable and response variable for each element in the established hierarchy,
      (iii) apply a hierarchical credibility weighting methodology to the elements of the electronic records from level 1, representing the least granular level in the hierarchy, to level n, representing the most granular level in the hierarchy, calculated recursively from level n, to determine a final estimated credibility for the electronic records based on the weight variable and response variable, wherein $\omega_i$ represents a weight for level i, $X_i$ represents an observed experience for level i, K represents a credibility factor, and the credibility for level i is calculated as:

$$Z_i = \frac{\omega_i}{\omega_i + K},$$

(iv) receive from a user of a web browser credibility weighting tool an indication of a geographic region, and
      (v) responsive to the received indication of the geographic region, graphically display a map-based presentation of the credibility information for the electronic records.

20. The system of claim 19, wherein the semantic rule and associated semantic tag were graphically defined by a user.

* * * * *